Jan. 19, 1932.   S. E. SCHROEDER   1,841,682
WASHING MACHINE
Original Filed Feb. 18, 1929   2 Sheets-Sheet 1
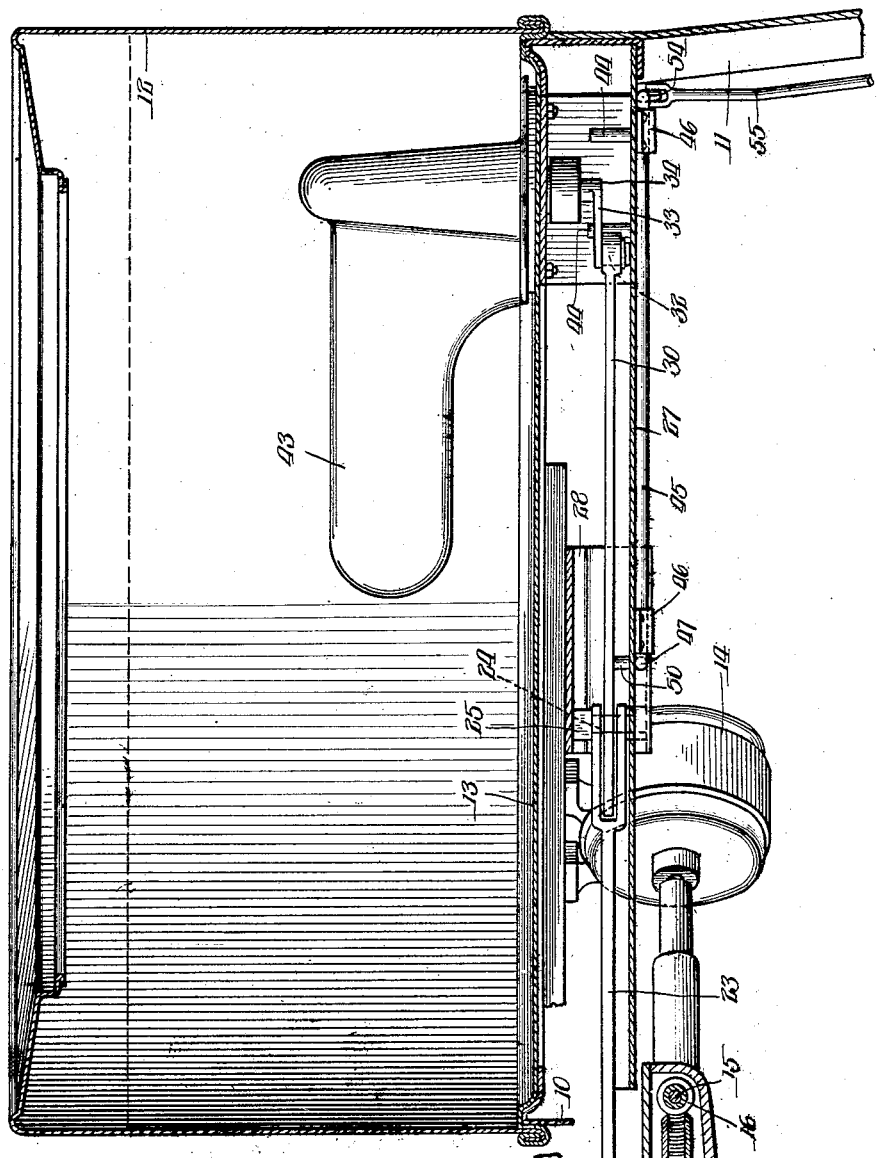
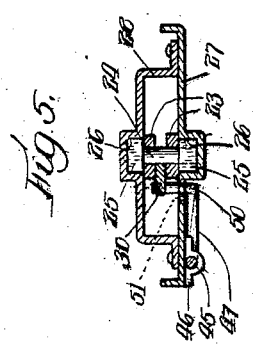
Inventor:
Simon E. Schroeder,
By Chindahl, Parker & Carlson
attys.

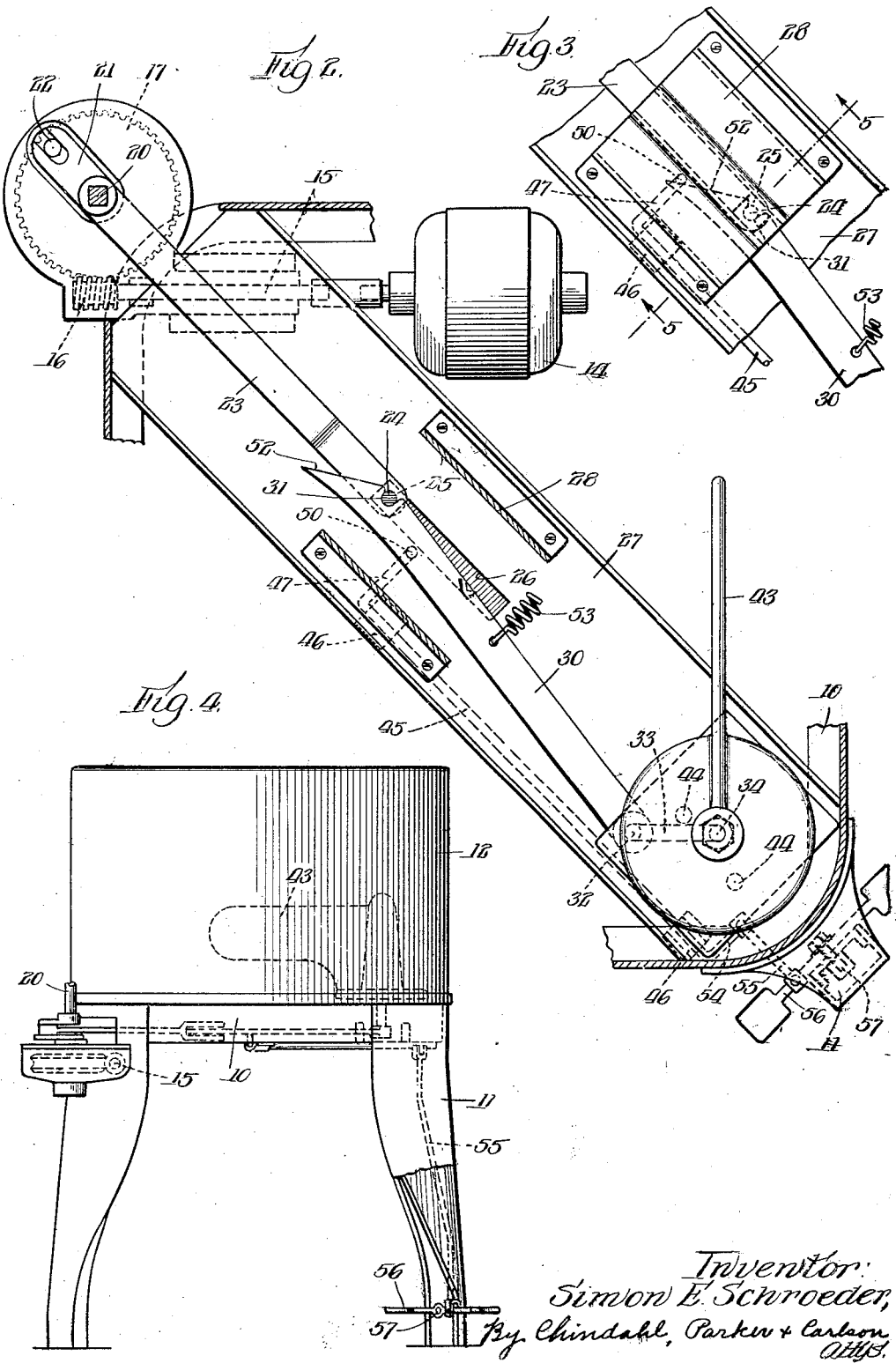

Patented Jan. 19, 1932

1,841,682

UNITED STATES PATENT OFFICE

SIMON E. SCHROEDER, OF BLOOMINGTON, ILLINOIS

WASHING MACHINE

Original application filed February 18, 1929, Serial No. 340,790. Divided and this application filed March 29, 1930. Serial No. 440,056.

The invention relates to improvements in washing machines and more particularly to those in which an agitator is positioned near the bottom of the tub and is driven by an oscillating vertical shaft projecting therethrough, this application being a division of my original application Serial No. 340,790, filed on February 18, 1929.

The general object of the invention is to provide a novel means for imparting an oscillating motion to the agitator from a source of power having a rotary motion.

Another object is to provide a novel means for disconnecting the oscillating mechanism without stopping the rotary motion of the source of power so that the later may be used to drive, or continue to drive, accessory devices attached to the machine, such as a wringer.

Other objects and advantages of the invention will become apparent from the following detailed description taken in connection with the accompanying drawings, in which:

Figure 1 is a vertical section taken diagonally of a machine embodying the features of my invention.

Fig. 2 is a fragmentary plan view of a washing machine with the tub removed.

Fig. 3 is a fragmentary plan view of a portion of the driving mechanism.

Fig. 4 is an elevation of the machine on a reduced scale.

Fig. 5 is a fragmentary sectional view taken along the line 5—5 of Fig. 3.

While the invention is susceptible of various modifications and alternative constructions, I have shown in the drawings and will herein describe in detail the preferred embodiment, but it is to be understood that I do not thereby intend to limit the invention to the specific form disclosed but aim to cover all modifications and alternative constructions falling within the spirit and scope of the invention as expressed in the appended claims.

In the exemplary form herein illustrated, the machine comprises a base frame 10 supported by suitable legs 11. Mounted upon the base frame 10 is a tub having side walls 12 and a bottom 13. The machine has an oscillatory agitator which, in this instance, is mounted in one corner of the tub, a vertical drive shaft projecting up through the bottom 13 of the tub adjacent one corner thereof for driving the agitator, and novel means for oscillating the shaft, mounted in the base frame 10 under the tub.

The machine is driven by a motor 14 connected to a horizontal drive shaft 15 on which a worm 16 is mounted. The latter drives a worm wheel 17 keyed to a vertical crank shaft 20 journaled in a portion of the base frame 10. Above the worm wheel 17, the crank shaft 20 has a double crank arm 21 having a crank pin 22, and above the crank arm 21 the crank shaft 20 extends to provide means for driving a wringer (not shown).

Attached to the crank pin 22 and extending toward the center of the machine is a reciprocating member 23 driven by the crank pin 22. The inner end of the reciprocating member 23 carries a vertical pin 24, the ends of which are mounted in blocks 25 sliding in two grooves 26 (see Fig. 5). The lower one of the grooves 26 is formed in a cross-brace 27 extending diagonally across the machine below the bottom 13 of the tub while the upper of the grooves 26 is formed in a bridge 28 secured to the cross-brace 27 by screws or the like.

Detachably connected to the pin 24 is a link 30 having a notch 31 at its inner end fitting around the pin 24. At its outer end, the link 30 is pivotally connected to a crank pin 32 of a crank arm 33 formed on the lower end of a vertical oscillatory shaft 34 below the bottom 13 of the tub. The shaft 34 projects up through the bottom 13 near one corner of the tub and forms a driving connection with an agitator mounted within the tub and having a vane 43.

To prevent the crank arm 33, and hence the agitator, from oscillating too far in either direction, two pins 44 extend upward from the cross-brace 27 to a height sufficient to permit the crank arm 33 to strike them at the ends of the stroke.

Means are provided to release the link 30 from the pin 24 so that motion of the agitator may be stopped without necessitating the shutting-off of the motor 14. In the present embodiment this means comprises a horizontal rod 45 journaled for pivotal movement in two bearings 46 secured on the under side of cross-brace 27. The inner end of the rod 45 is bent at a right angle to form a lever 47 and then upward to form a pin 50 projecting through a hole 51 on the cross-brace 27 (see Fig. 5). When the pin 50 is in its uppermost position and the link 30 is at the extremity of its stroke, as shown in Fig. 3, a cam surface 52 formed on the inner end of the link 30 strikes against the pin 50, and the link 30 is moved out of engagement with the pin 24 as the former moves toward the other extremity of its stroke. A contractile spring 53 anchored to the bottom 13 of the tub and attached to the link 30 moves the link 30 back toward the pin 24 when the pin 50 is moved downward out of engagement with the cam surface 52. If the pin 24 is not opposite the notch 31, either the cam surface 52 or the edge of the link adjacent the notch will strike the pin 24 and cause the link 30 to move sidewise to let the pin 24 slide to a point opposite the notch, when the spring 53 will immediately cause the latter to engage the pin. Thus, the cam surface 52 serves to disengage the link from the pin 24 and to reengage it.

The outer end of the rod 45 is bent at a right angle to form a lever 54 and attached to its end is a rod 55 (Fig. 4) extending downwardly along the inside of the adjacent leg 11. The lower end of the rod 55 is attached to a foot-lever 56 eccentric of the pivotal point of the latter. The foot-lever is pivoted at its middle on a screw 57 threaded into a lug on the inside of the leg 11.

To operate the machine, assume the parts to be in the position shown in Fig. 2 with the motor 14 running. The crank shaft 20 is rotated through the worm 16 and wheel 17 causing the member 23 to be reciprocated. The link 30 is also reciprocated because of its attachment to the member 23 by means of the notch 31 and pin 24. This motion causes the crank arm 33, and hence the shaft 34 and the agitator, to be oscillated through an arc slightly less than 180°, because of the fact that crank arm 33 has a greater radius than that of the crank arm 21.

In Fig. 2 the pin 50 is at its lowest position so that it cannot strike the cam surface 52. To stop the oscillation of the agitator by disengaging the link 30 from the pin 24, the left hand end of the foot-lever 56, as viewed in Fig. 4, is pressed down so as to raise the rod 55 and, in turn, raise the pin 50 by pivoting the rod 45. The pin 50 may be completely raised when the link 30 is in the position shown in Fig. 3. The cam surface 52 then strikes the pin 50 and the link 30 is forced out of engagement with the pin 24 against the action of the spring 53.

To throw the agitator back into oscillation, the right hand end of the foot-lever 56, as seen in Fig. 4, is depressed pulling the rod 55 downward. Thus, the pin 50 is withdrawn from contact with the cam surface 52 and the spring 53 draws the link 30 back into engagement with the pin 24 when the latter moves to a position in front of the notch 31.

It is apparent from the above description that a novel means for actuating an agitator has been provided as well as a novel means for stopping the oscillatory motion of the agitator while the driving means continues in operation to drive accessory devices such as a wringer.

I claim as my invention:

1. In a washing machine of the character described, the combination of an oscillatory member for driving an agitator, a rotating driver, a reciprocatory member driven by said driver, a link detachably connecting said reciprocatory member with said oscillatory member, and cam means operable at will for disconnecting said link from said reciprocatory member and for reconnecting it thereto.

2. In a washing machine, the combination of a rotating part, a reciprocatory member driven by said rotating part, an oscillatory member for driving an agitator, a link attached to said oscillatory member and detachably connected to said reciprocatory member, and cam means operable by the reciprocation of said link to detach said link from said reciprocatory member.

3. In a washing machine, the combination of a rotating part, a reciprocatory member driven by said rotating part, an oscillatory member for driving an agitator, a link attached to said oscillatory member and detachably connected to said reciprocatory member, spring means adapted to hold said link in connection with said reciprocatory member, and manually controlled cam means operable to detach said link from said reciprocatory member against the action of said spring means.

4. In a washing machine, the combination of a reciprocatory member, means for reciprocating said member, an oscillatory member, a link connected at one end to said oscillatory member and detachably connected at its other end to said reciprocatory member, means tending to hold said link connected to said reciprocatory member, means shiftable into and out of engagement with said link for disconnecting it from said reciprocatory member, and means for shifting said disconnecting means.

5. In a washing machine, the combination of a reciprocatory member having a pin on one end, means for reciprocating said member, an oscillatory member having a crank arm, a link connected at one end to said crank arm and having a hook at its other end in detachable engagement with said pin, means tending to hold said hook in engagement with said pin, a second pin shiftable into and out of the path of said link for moving said hook out of engagement with said pin, and means for shifting said second pin.

6. In a washing machine, the combination of a reciprocatory member having a pin at one end, an oscillatory member, a link connected at one end, to said oscillatory member and having at its other end a hook arranged to engage said pin and a cam surface, a spring attached to said link tending to hold said hook in engagement with said pin, a second pin swingable into and out of the path of said cam surface and constructed to cooperate with said cam surface to move the hook out of engagement with said first-mentioned pin, and a foot-lever for swinging said second pin.

7. In a washing machine of the character described, the combination of an oscillatory member for driving an agitator, a rotating driver, a reciprocatory member driven by said driver and having a pin at its free end, a link connected to said oscillatory member and having a hook at its free end adapted to engage said pin, a spring tending to hold said hook and pin in engagement, a cam surface formed on the free end of said link, and means operable at will mounted for swinging movement into and out of the path of said cam surface and adapted to cause said cam surface to cam said hook out of engagement with said pin, said cam surface coacting with said pin, when said means is swung out of the path thereof, to cam said hook into engagement.

8. In a washing machine of the character described, the combination of an oscillatory member for driving an agitator, a rotating driver, and means forming a detachable connection between said oscillatory member and said driver and including manually controlled cam means for detaching and reestablishing said connection.

In testimony whereof, I have hereunto affixed my signature.

SIMON E. SCHROEDER.